United States Patent
Ishiwatari et al.

(10) Patent No.: US 6,631,349 B1
(45) Date of Patent: *Oct. 7, 2003

(54) SPEECH RECOGNITION METHOD AND SYSTEM

(75) Inventors: Kazuyoshi Ishiwatari, Higashimurayama (JP); Kazuo Kondo, Fujisawa (JP); Shinji Wakisaka, Kunitachi (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/554,003

(22) PCT Filed: Nov. 27, 1997

(86) PCT No.: PCT/JP97/04324

§ 371 (c)(1), (2), (4) Date: May 9, 2000

(87) PCT Pub. No.: WO99/28898

PCT Pub. Date: Jun. 10, 1999

(51) Int. Cl.[7] .............................................. G10L 15/00
(52) U.S. Cl. ........................................ 704/239; 704/252
(58) Field of Search ................................ 704/255, 239, 704/238, 240, 232, 245, 252, 256, 251

(56) References Cited

U.S. PATENT DOCUMENTS 4,783,803 A * 11/1988 Baker et al. ................ 704/252
4,783,804 A * 11/1988 Juang et al. ................ 704/245
4,803,729 A * 2/1989 Baker ......................... 704/241
5,268,990 A * 12/1993 Cohen et al. ............... 704/200
5,515,475 A * 5/1996 Gupta et al. ................ 704/242
5,705,896 A * 1/1998 Choi ........................... 315/307
5,983,180 A * 11/1999 Robinson .................... 704/254

OTHER PUBLICATIONS

"Fundamentals of Speech Recognition", 1993, L. Rabiner et al, pp. 231–232.

* cited by examiner

Primary Examiner—Daniel Abebe
(74) Attorney, Agent, or Firm—Mattingly, Stanger & Malur, P.C.

(57) ABSTRACT

Frames making up an input speech are each collated with a string of phonemes representing speech candidates to be recognized, whereby evaluation values regarding the phonemes are computed. The frames are each compared with part of the phoneme string so as to reduce computations and memory capacity required in recognizing the input speech based on the evaluation values. That is, each frame is compared with a portion of the phoneme string to acquire an evaluation value for each phoneme. If the acquired evaluation value meets a predetermined condition, part of the phonemes to be collated with the next frame are changed. Illustratively, if the evaluation value for the phoneme heading a given portion of collated phonemes is smaller than the evaluation value of the phoneme which terminates that phoneme portion, then the head phoneme is replaced by the next phoneme. The new portion of phonemes obtained by the replacement is used for collation with the next frame.

2 Claims, 7 Drawing Sheets

SPEECH RECOGNITION METHOD AND SYSTEM

TECHNICAL FIELD

The present invention relates to a speech recognition method for recognizing input speech using phoneme and language models, as well as to a speech recognition system adopting that method.

BACKGROUND ART

Today, functions and devices of speech recognition are finding their way into small-sized data apparatuses such as portable speech translators and personal digital assistants (PDA), as well as into car navigation systems and many other appliances and systems.

A conventional speech recognition method typically involves storing phoneme and language models beforehand and recognizing input speech based on the stored models, as described illustratively in "Automatically Translated Telephone" (pp. 10–29, from Ohm-sha in Japan in 1994, edited by Advanced Telecommunications Research Institute International). A language model is made up of pronunciations of different words and syntax rules, whereas each phoneme model includes spectral characteristics of each of a plurality of speech recognition units. The speech recognition unit is typically a phoneme or a phoneme element that is smaller than a phoneme. The background art of this field will be described below with phonemes regarded as speech recognition units. Spectral characteristics stored with respect to each phoneme may sometimes be referred to as a phoneme model of the phoneme in question.

The language model determines a plurality of allowable phoneme strings. At the time of speech recognition, a plurality of phoneme model strings are generated corresponding to each of the allowable phoneme strings. The phoneme model strings are each collated with the input speech so that the phoneme model string of the best match is selected. In collating each phoneme model string with the input speech, the input speech is divided into segments called frames. The frames are each collated successively with a plurality of phoneme models constituting each phoneme model string so as to compute evaluation values representing similarities between the phoneme model in question and the input speech. This collating process is repeated with different phoneme model strings, and then with different frames. The evaluation values obtained by collating the phoneme models of each phoneme model string with a given frame of the input speech are also used in the collation of the next frame.

As outlined above, the conventional speech recognition method takes time to make processing because it involves collating all frames of the input speech with all phoneme models in all phoneme model strings. Furthermore, it is necessary to retain in memory, for collation of the next frame, the evaluation values acquired by collating the phoneme models in each phoneme model string with a given frame of the input speech. As a result, an ever-larger amount of memory is needed the greater the total number of phoneme model strings.

The so-called beam search method has been proposed as a way to reduce such prolonged processing time. This method involves, at the time of collating the input speech with each frame, limiting the phoneme models only to those expected to become final candidates for speech recognition. More specifically, checks are made on all phoneme model strings to see, based on the evaluation values computed in a given frame for all phoneme model strings, whether each of the phoneme models should be carried forward for collation in the next frame. There are a number of schemes to determine how to carry forward phoneme models: (1) a fixed number of phoneme models starting from the model of the highest evaluation value are carried forward; (2) an evaluation value threshold is computed so that only the phoneme models with their evaluation values higher than the threshold are carried forward; or (3) the above two schemes are used in combination.

DISCLOSURE OF INVENTION

One disadvantage of the conventional beam search method is that it takes time to select phoneme models. That is, scheme (1) above of carrying forward a fixed number of phoneme models starting from the model of the highest evaluation value must sort the evaluation values of all phoneme models. Sorting generally takes time. According to scheme (2) above whereby only the phoneme models with their evaluation values higher than a threshold are carried forward, it also takes time to compute the threshold value.

It is therefore an object of the present invention to provide a speech recognition method suitable for minimizing computing time and for reducing the required memory capacity, and a speech recognition system adopting that method.

In carrying out the invention and according to one aspect thereof, there is provided a speech recognition method for collating a portion of speech (e.g., frame) with part of a plurality of speech recognition units (e.g., phonemes or phoneme elements) representing speech candidates. Depending on the result of the collation with the current speech portion, the method dynamically selects that part of speech recognition units which is to be collated with the next speech portion. Because only the necessary parts of speech recognition units are collated, the processing time and memory area for collation purposes are significantly reduced.

The inventive speech recognition method comprises the steps of:

(a) collating one of the plurality of speech candidates successively with an ordered plurality of speech parts obtained by dividing the target speech; and (b) performing the step (a) on another plurality of speech candidates;

wherein the step (a) includes the steps of:

(a1) determining a plurality of likelihoods representing similarities between one of the ordered plurality of speech parts on the one hand, and a portion of speech recognition units constituting part of an ordered plurality of speech recognition units representing one of the plurality of speech candidates on the other hand;

(a2) determining a plurality of evaluation values representing similarities between the portion of speech recognition units and the target speech, based on the plurality of likelihoods determined in the step (a1) and on a plurality of transition probabilities corresponding to different combinations of the portion of speech recognition units; and (a3) determining, based on the determined plurality of evaluation values, a new portion of speech recognition units for use with the next speech part in the ordered plurality of speech parts;

wherein the new portion of speech recognition units is used when the step (a) is carried out on the next speech part in the ordered plurality of speech parts.

BEST MODE FOR CARRYING OUT THE INVENTION

Figure 1:
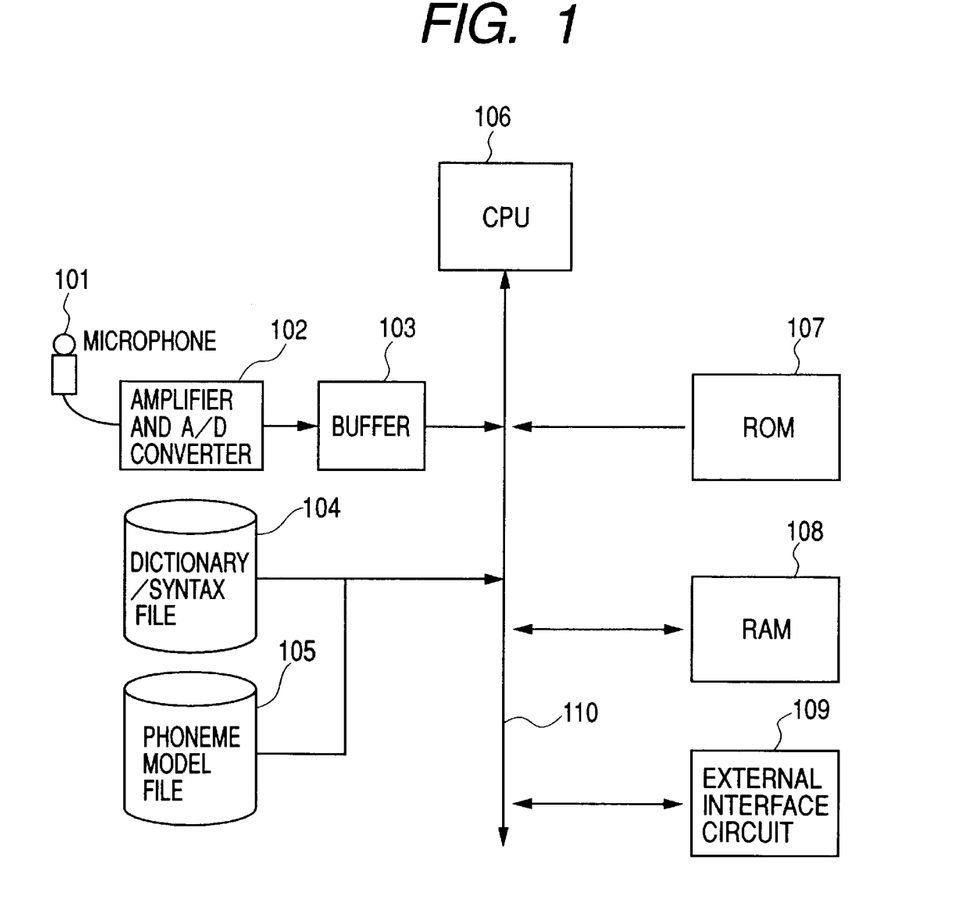
FIG. 1 is a schematic block diagram of a speech recognition system that uses a speech recognition method according to the invention.

In FIG. 1, reference numeral 101 stands for a speech input microphone; 102 for an amplifier and an A/D converter; 103 for an FIFO buffer that temporarily holds the input speech; 104 for a dictionary/syntax file that stores a vocabulary of words or the like representing speech candidates to be recognized, as well as syntax rules; and 105 for a phoneme model file that stores phoneme models with respect to a plurality of speech recognition units. The files 104 and 105 are each implemented typically in the form of a ROM such as a semiconductor ROM or a CD-ROM. With this embodiment of the invention, phonemes are used as speech recognition units. Also in FIG. 1, reference numeral 107 stands for a read-only memory (ROM) that stores a speech recognition program; 108 for a random access memory (RAM) used by the program as a work area; and 109 for any one of external interface circuits for transferring recognition result data to a display device (not shown) or to some other device over a transmission line. Reference numeral 106 denotes a microprocessor (CPU) that controls the above-mentioned circuits and memories through a bus 110 or signal lines not shown. Of the configured devices, those except for the microphone 101 should preferably be fabricated on a single semiconductor chip by use of integrated circuit technology.

When initialized by a POWER-ON-RESET or like command, the CPU transfers the speech recognition program from the ROM 107 to the RAM 108. The program is transferred so as to take advantage of the RAM 108 affording higher access speeds than the ROM 107. After the program transfer, the CPU carries out the transferred program.

How the speech recognition program works is described below with reference to the flowchart of FIG. 2. When the program is started, the phoneme model file 105 is read into the RAM 108 (step 201). The phoneme model file 105 contains characteristic vectors obtained by analyzing each of a plurality of phonemes used as speech recognition units. The characteristic vectors are the same as those generated for input speech, to be described later. With this embodiment, speech recognition is carried out on the commonly utilized hidden Marcov model (called the HMM model hereunder). For the speech recognition pursuant to the HMM model, a phoneme model associated with each phoneme has transition probabilities regarding transition from the phoneme in question to other phonemes.

The dictionary/syntax file 104 is then read into the RAM 108 (step 202). The dictionary/syntax file 104 contains a vocabulary of words or the like with which to recognize a target speech. Each word is composed of a character string representing a plurality of speech recognition units making up the word to be recognized. More specifically, each word is made up of a series of alphabetic characters denoting a group of phonemes constituting the word to be recognized. For example, a name "SUZUKI" is represented by a string of three phonemes "su, zu, ki." Although the file 104 also includes syntax rules, descriptions of any speech recognition procedures using syntax rules are omitted, and speech recognition processing by use of only words will be described below.

Each of the words in the dictionary/syntax file 104 is translated into the corresponding phoneme model string (step 203). The translation replaces each of the phonemes constituting each word read in step 202 by a phoneme model corresponding to each phoneme read in step 201. This provides a phoneme model string corresponding to the phoneme string making up each word.

The speech input through the microphone 101 is amplified by the amplifier and A/D converter 102 before being translated into a digital signal. The digital signal thus acquired is sampled in increments of a predetermined time unit through the FIFO buffer 103. Speech data sampled at several points are sent collectively to the RAM 108 (step 205). The collective speech data of several points are called a frame. A frame generally refers to speech data over a period of 15 to 30 ms. The next frame is usually generated from the input speech by a shift over a time period shorter than one frame time (e.g., 5 to 20 ms). The spectrum of each frame is analyzed, and a characteristic vector string denoting characteristics of the frame in question is created (step 206). The commonly utilized linear predictive coding (LPC) is used for the analysis, and an LPC cepstrum is generated as a characteristic parameter. However, this is not limitative of the invention. Other speech analyses may be used instead, and alternative characteristic vectors such as LPC delta cepstrum, mel-cepstrum or logarithmic power may also be used.

Based on the generated characteristic vector string and on the phoneme model string constituting each of the words obtained in step 203, each of the phonemes making up each word is collated with the input frame in a manner stipulated by the HMM model. More specifically, likelihoods between each of the phonemes and the input frame are computed. Based on the likelihoods thus acquired, a plurality of evaluation values are computed which represent similarities between each of the phonemes making up the phoneme string corresponding to the word in question on the one hand, and the input frame on the other hand (step 207). Details of the computations will be explained later. The collating process is carried out on every word contained in the dictionary/syntax file 104. Thereafter, steps 205 through 207 are repeated on subsequent frames. In step 204 reached during the repetitive processing, a check is made to see if the input speech has ended on the basis of its power value. If the input speech is judged to be have ended, the word including the phoneme of the highest evaluation value is selected (step 208). The selected word is transferred to a display device or a data processor, not shown, through the external interface circuit 109 (step 209). In the collating step 207, a known forward computation algorithm is used to compute evaluation values regarding the phonemes in each phoneme model string. This embodiment is characterized by a function to restrict the phoneme models of the phonemes for which evaluation values are computed.

Below is a description of a conventional method for computing evaluation values using a forward computation algorithm, followed by a description of the inventive method for computing evaluations values using the same forward computation algorithm.

Figure 5:
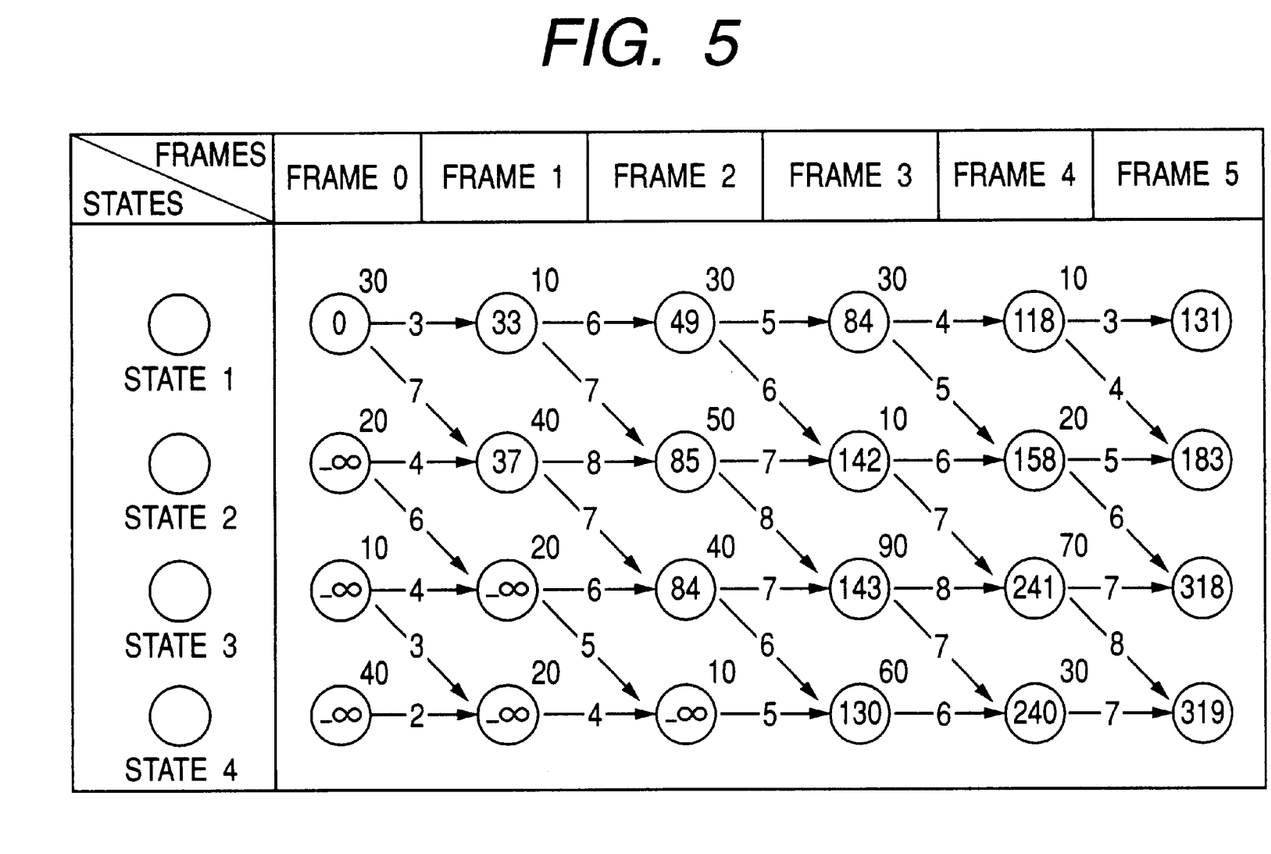
FIG. 5 is a schematic view showing a conventional procedure for computing evaluation values regarding speech model strings.

FIG. 5 is a trellis chart showing a conventional method that uses the forward computation algorithm in computing evaluation values of each phoneme model within each phoneme model string. The speech recognition based on the HMM model regards each of a plurality of phoneme modes constituting a phoneme model string corresponding to one word as representative of one state. In FIG. 5, states 1 through 4 are vertically shown to represent four phoneme models making up a phoneme model string corresponding to each word. The four states are ordered the same way as the phoneme models constituting the phoneme model string in question. For example, states 1 through 4 correspond to a first through a fourth phoneme model which appear in the phoneme model string. In FIG. 5, successively input frames are presented in the horizontal direction.

Each of circles in FIG. 5 denotes a combination of a frame with a state, and each encircled number represents an evaluation value of the phoneme model corresponding to the state in question. Shown at the top right of each circle is a likelihood between the frame in question and its phoneme model. How such likelihoods are computed will be explained later. A number on a rightward arrow coming out of each circle denotes the probability that the state in question will change to the same state in the next frame. Such transition probabilities are determined in advance independently of input frames. Likewise, a number on an arrow from each circle pointing to bottom right denotes the probability that the state in question will change to the next state in the next frame. Such transition probabilities are also determined beforehand independently of input frames.

The evaluation value of each state for frame 0 is given as an initial value. Because frame 0 is considered to head an input speech signal, an initial value of 0 is assigned only to the evaluation value of the phoneme model (state 1) which heads the phoneme model string constituting the target word to be recognized; evaluation values of the other phoneme models are assigned "$-\infty$" as an initial value each. The initial values are thus established on the assumption that the first frame of an input speech always matches the phoneme model that heads a phone model string. The evaluation value of each of the states in frame 1 and subsequent frames is determined based on the likelihood regarding the preceding frame and the state associated therewith, and on the transition probability defined beforehand about the state in question. How such determination takes place is described below.

Figure 6:
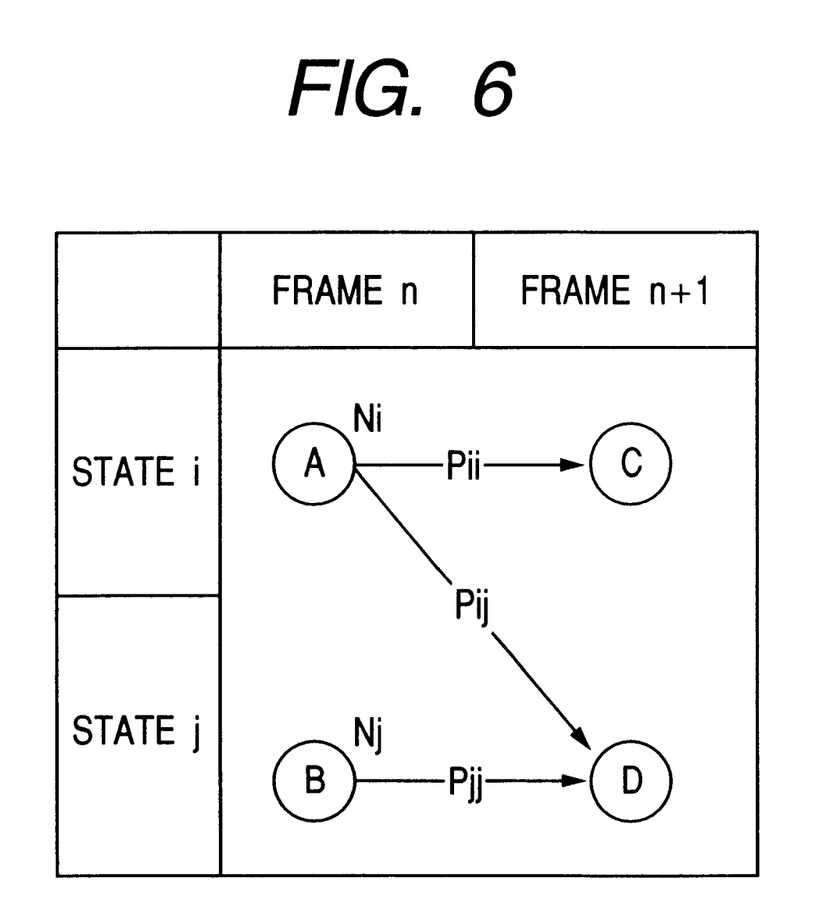
FIG. 6 is a schematic view illustrating a procedure for computing evaluation values using transition probabilities.

In FIG. 6, it is assumed that state "i" and state "j" in the phoneme model string constituting a given word are assigned evaluation values A and B, respectively, with regard to frame "n." These evaluation values are either determined by a collating process in the preceding frame or given as initial values regarding the states in question. Likelihoods between frame "n" and states "i" and "j" are computed as similarities between the phoneme model corresponding to each state on the one hand and frame "n" on the other hand. More specifically, the similarities are represented in a known manner by distances between the characteristic vector of the phoneme model corresponding to each state on the one hand, and the characteristic vector obtained by analyzing frame "n" on the other hand. In practice, such distances are typically Euclidian distances that are each given in a known manner by the squared sum of coordinate differences in different dimensions between two vectors. If each dimension requires normalization, acquisition of the squared sum is preceded by normalization of each dimension using a predetermined coefficient. If the above-mentioned LPC cepstrum is used as the characteristic vector, these coefficients are cepstrum coefficients. With this embodiment, the likelihoods between states "i" and "j" on the one hand and frame "n" on the other hand are assumed as Ni and Nj respectively.

An evaluation value C of state "i" regarding the next frame "n+1" is represented, if no state precedes that state "i," by the sum of the likelihood Ni and a transition probability Pii from state "i" to state "i." The evaluation value of state "j" regarding frame "i+1" is computed as follows: suppose that a transition is effected from state "i" in frame "n" to state "j" in frame "n+1." In that case, an evaluation value Di of state "j" in frame "n+1" is given as the sum of the evaluation value A of state "i" in frame "n," likelihood Ni of state "i" in frame "n," and a transition probability Pij from state "i" to state "j." If it is assumed that a transition is effected from state "j" in frame "n" to state "j" in frame "n+1," then an evaluation value Dj of state "j" in frame "n+1" is given as the sum of the evaluation value B of state "j" in frame "n," likelihood Nj of state "j" in frame "n," and a transition probability Pjj from state "j" to state "j." Eventually, the greater of the evaluation values Di and Dj is adopted as the evaluation value for state "j" in frame "n+1." While likelihoods about states "i" and "j" in frame "n+1" are also computed, they are used to calculate evaluation values of these states in the next frame "n+2."

FIG. 5 shows evaluation values computed in the above-described manner ranging from frame 0 to frame 5. When the last frame is reached, the largest of a plurality of evaluation values regarding a given word is adopted as the evaluation value of the word in question. In the example of FIG. 5, a value 319 denotes the evaluation value of the word. Although the example of FIG. 5 assumes only one of two states (i.e., the same state or the next state) as the destination of the transition starting from each state, a transition from a given state may in fact occur to any one of a larger number of states. In this case, the evaluation values of each state following the transition are also computed.

Referring to the trellis chart obtained in the manner described above, the state with the largest evaluation value is selected for each frame, and the states thus selected for different frames make up a path known as a Viterbi path. In the example of FIG. 5, the path connecting (frame 0, state 1), (frame 1, state 2), (frame 2, state 2), (frame 3, state 3), (frame 4, state 3) and (frame 5, state 4) constitutes a Viterbi path. The state having the highest evaluation value in a given frame represents the phoneme of the highest similarity in the word being processed with respect to the frame in question. It follows that the string of states linked by a Viterbi path denotes the phoneme string similar to the input speech with regard to the word being processed.

Figure 2:
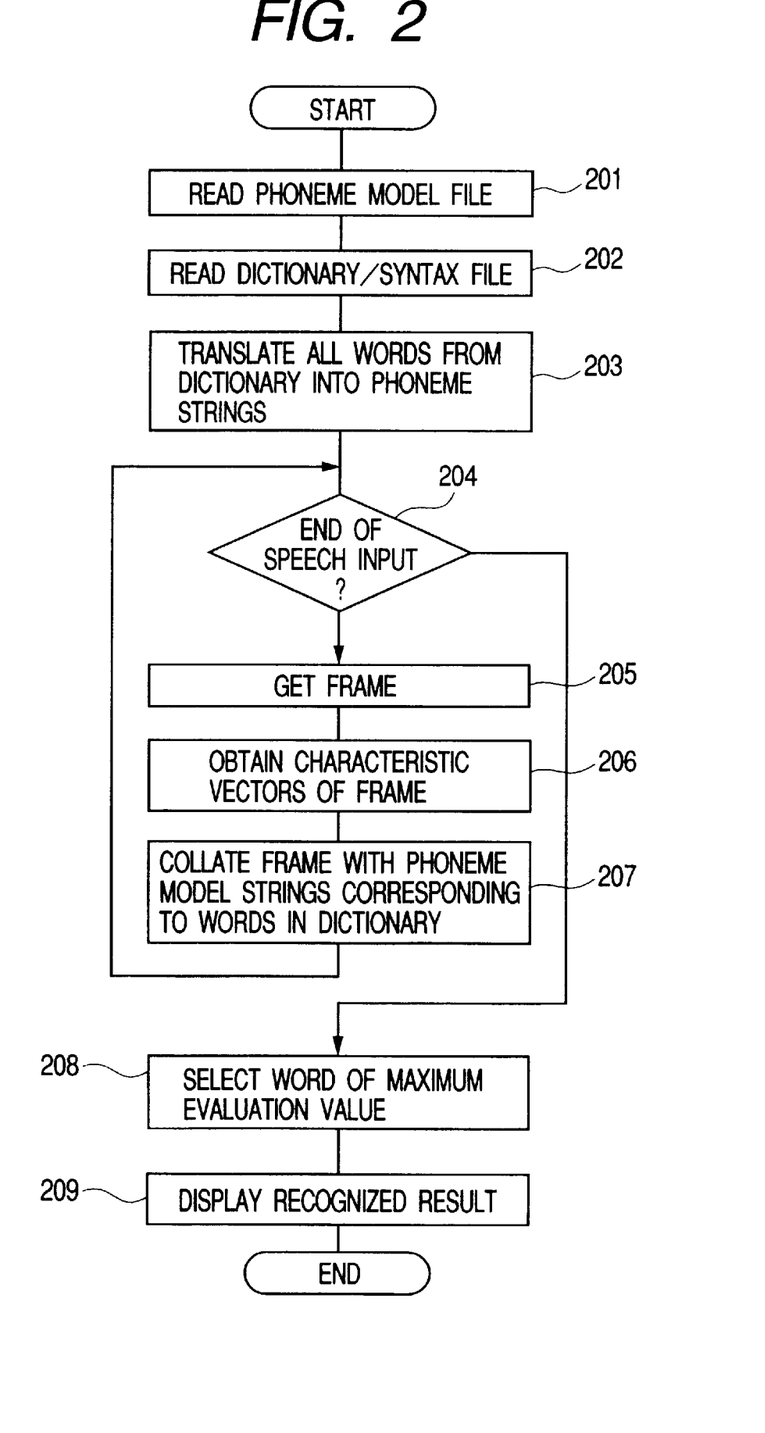
FIG. 2 is a schematic flowchart of steps constituting a speech recognition program used by the system of FIG. 1.

As described above, the conventional method for evaluation value computation requires computing the evaluation values of all states corresponding to target phoneme model strings regarding all frames. This means that the number of computations, defined by the expression shown below, increases as the number of words and the number of frames become larger. This requires installing a growing quantity of memory for accommodating interim evaluation values. The expression is:

No. of computations=No. of frames×No. of words× average No. of phoneme models regarding each word This embodiment of the invention alleviates the above problem by having recourse to the collating step 207 (FIG. 2). The step involves limiting target phoneme models so that evaluation values are computed regarding only part of all phoneme models constituting the phoneme model string corresponding to each word. The collating step 207 is explained below.

Figure 3:
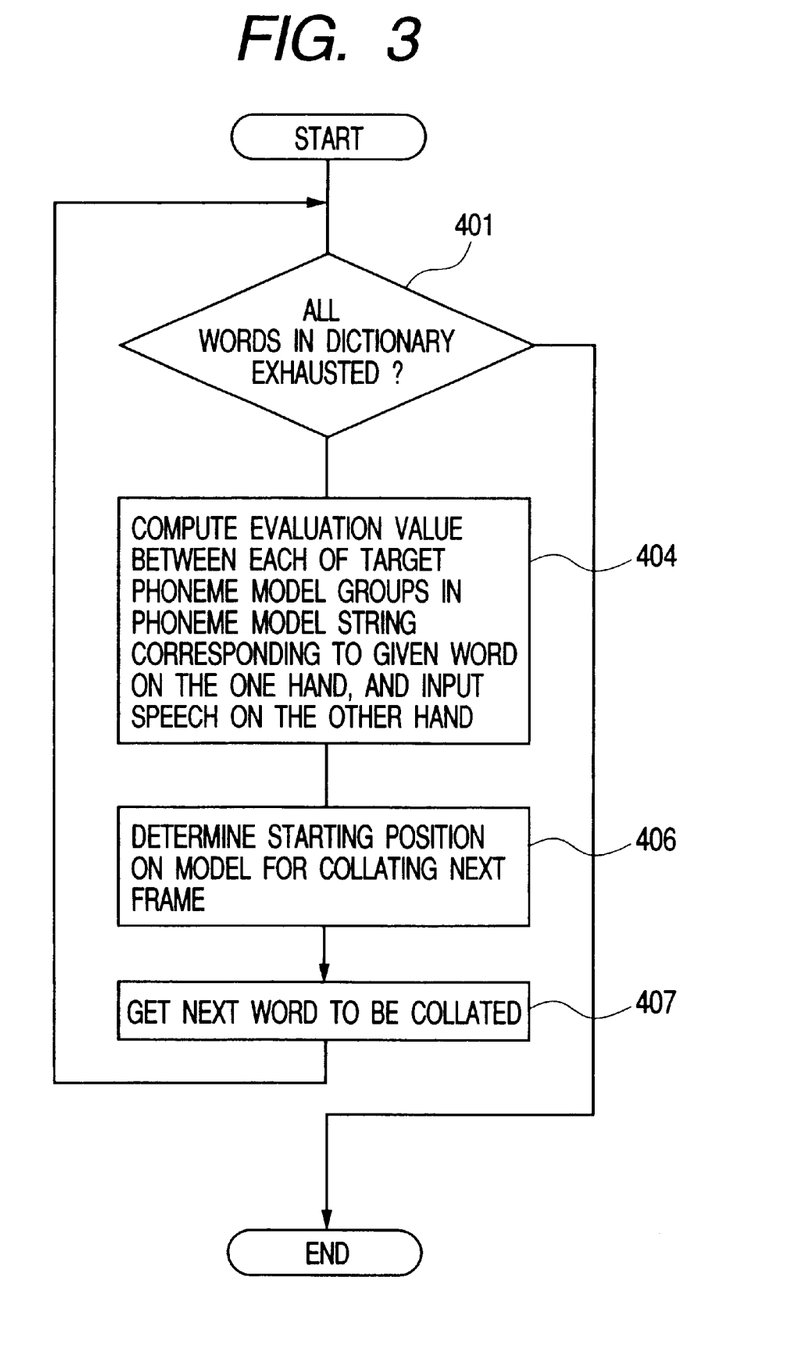
FIG. 3 is a schematic flowchart of steps detailing a collating process (step 207) in the flowchart of FIG. 2.

In carrying out the collating step 207, as shown in FIG. 3, evaluation values are computed between an input frame and each of a selected group of phoneme models constituting a phoneme model string corresponding to the word in question (step 404).

Of the phoneme models in the phoneme model string corresponding to each word, a predetermined plurality of phoneme models (m+1) which head the phoneme model string are selected for collation with the first frame. Given the result of step 404, the phoneme model heading the group of phoneme models for collation with the next frame is determined within the phoneme model string with respect to the same word (step 406). Then the next word is selected for the collation (step 407). Steps 404 and 406 are repeated until all words in the dictionary/syntax file 104 have been exhausted (step 401).

Figure 4:
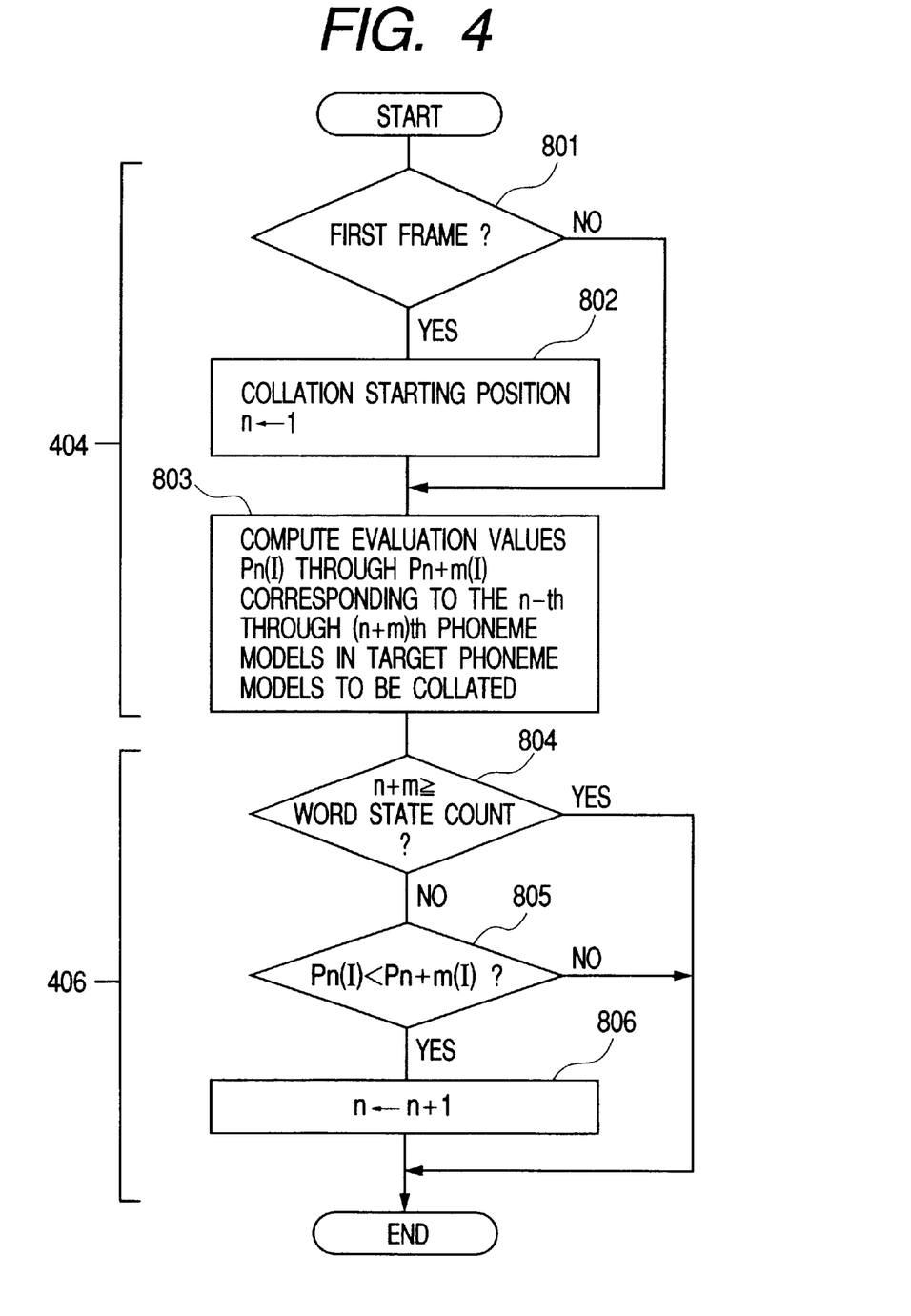
FIG. 4 is a schematic flowchart of steps detailing an evaluation value computing process (step 404) and a collation starting position updating process (step 406) of FIG. 3.

More specifically, as shown in FIG. 4, step 404 is started by checking to see if the frame being processed is the first frame (step 801). If the current frame is found to be the first frame, then a value of 1 is set for position "n" of the phoneme model from which to start the collation within the phoneme model string corresponding to the word in question. That is, the collation is set to begin from the phoneme model that heads the phoneme model string. If the current frame is not the first frame, then the value of the collation starting position "n" determined in step 406 is used for the frame. Based on the n-th phoneme model thus determined, step 803 is carried out to compute evaluation values Pn(I) through Pn+m(I) regarding each of the (n+m) th phoneme model s with respect to the input frame. Reference character I denotes a frame number. The computations involved here are performed as per the conventional method described with reference to FIG. 5. Likelihoods between each of the phoneme models on the one hand and the input frame on the other hand are also computed according to the conventional method.

Later, step 406 is executed to determine the collation starting position in the next frame regarding the same word by use of the computed evaluation values. More specifically, a comparison is made between evaluation values Pn(I) and Pn+m(I) with respect to the n-th and (n+m) the phoneme models positioned on both ends of the collated group of (m+1) phoneme models (step 805). If the evaluation value Pn+m(I) is found to be larger than the evaluation value Pn(I), then the collation starting position "n" for the next frame is incremented by 1 (step 806). That is because if the result of check 804 is affirmative, then the input frame is judged to be already less similar to the n-th phoneme model than to a subsequent phoneme model. If the result of the check 805 is negative, the collation starting position "n" remains unchanged. As discussed above with reference to FIG. 5, a Viterbi path has only to be distinguished correctly and evaluation values need only be computed precisely with regard to the states (phoneme models) on that path. If the result of the check 805 is found to be affirmative, that means the Viterbi path in the trellis chart now passes through a phoneme subsequent to the n-th phoneme model in the frame being processed. It is thus expected that in the ensuing frames, omitting the computation of evaluation values regarding the nth phoneme model will not result in erroneous computations of evaluation values.regarding the word being processed.

The steps above are repeated on each of the subsequent frames. Step 805 is preceded by step 804 which determines whether there exists any other state that may be changed into a new target for collation. More specifically, a check is made in step 804 to see if the number (n+m) of the phoneme model at the end of the current group of phoneme models being collated is equal to the total number of states regarding the word being processed. That is, a check is made to see if the (n+m) th phoneme model at the end of the phoneme model string being processed is the last phoneme model in the phoneme model string with respect to the word being processed. If the result of the check in step 804 is affirmative, steps 805 and 806 will not be carried out. Thus if any new frame is subsequently input, evaluation values are continuously computed regarding (m+1) phoneme models at the end of the phoneme model string. This completes the collation of one frame with the phoneme model string corresponding to one word.

Figure 7:
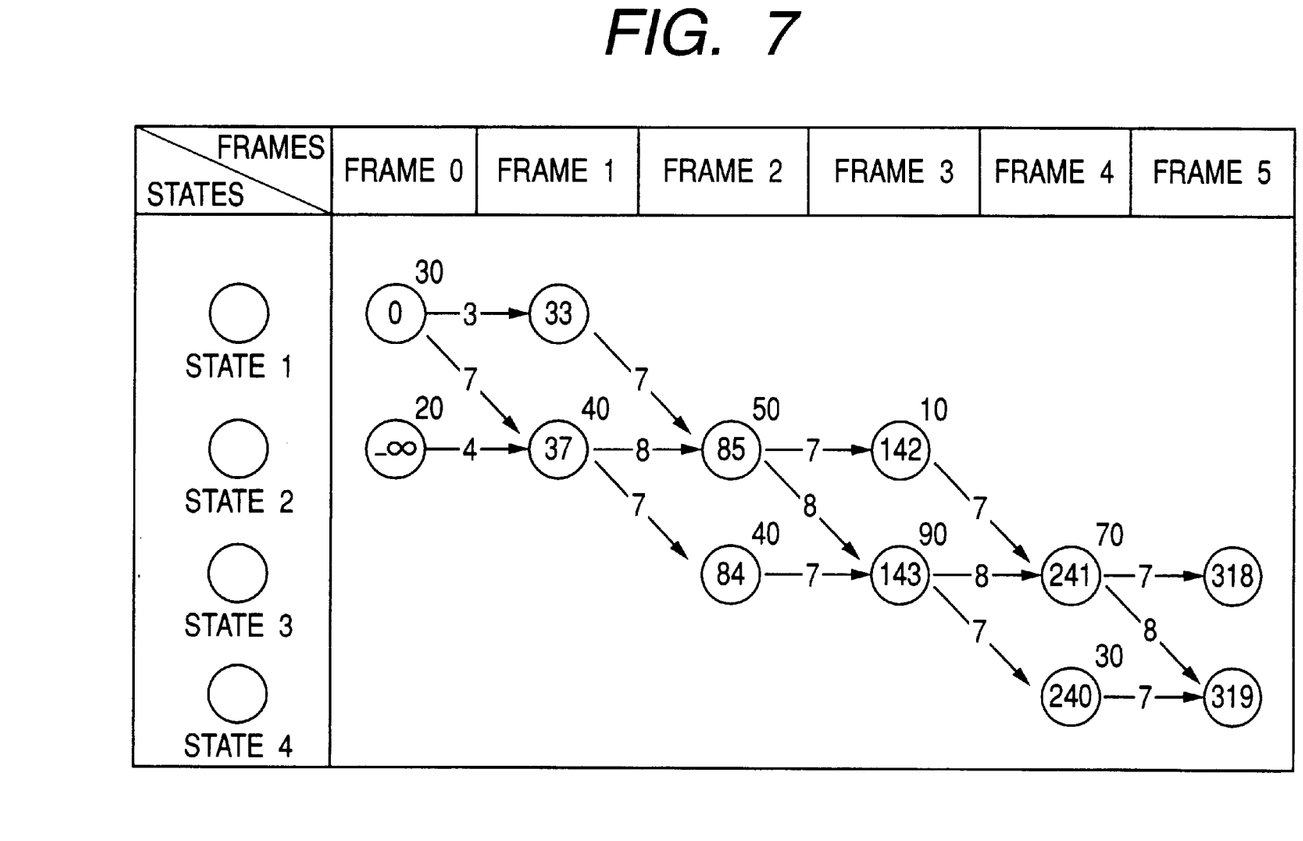
FIG. 7 is a schematic view depicting a procedure of the invention for computing evaluation values regarding speech model strings.

Illustratively, FIG. 7 is a trellis chart in effect when m+1=2 between the phoneme model string shown in FIG. 5 and the input frame string 0, 1, etc., in the figure. Of states 1 through 4, only two states (m+1=2) are subjected to the following steps:

In the first frame 0, the result of the check in 801 is affirmative. In step 802, the collation starting position "n" for states 1 and 2 is set to 1 so that states 1 and 2 are selected to be collated. In step 803, evaluation values P1(0) and P2(0) of these states are not computed. Instead, initial values 0 and −∞ are used unmodified as the evaluation values of states 1 and 2. Step 803 is carried out to compute likelihoods of states 1 and 2 in frame 0. The likelihoods are assumed here to be 30 and 20 for states 1 and 2 respectively. The result of the check in step 804 is negative with respect to the current group of phoneme models being collated. For the above two evaluation values, the result of the check in step 805 is negative. Thus the collation starting position "n" remains unchanged and the collation of the current word in frame 0 is terminated.

If the same word is collated with the next frame 1, the result of the check in step 801 is negative. In step 803, evaluation values P1(1) and P2(1) for the first and second phoneme models are computed. These evaluation values are assumed here to be 33 and 37 for the first and second phoneme models respectively. In step 803, likelihoods between frame 1 on the one hand and states 1 and 2 on the other hand are also computed; the likelihoods are assumed to be 10 and 40 for states 1 and 2 respectively. The result of the check in step 804 is negative for the current group of phoneme models being collated. Because the result of the check in step 805 is affirmative for the two evaluation values above, step 806 is carried out to update the collation starting position "n" to 2.

A comparison between the evaluation values for states 1 and 2 above shows that the evaluation value for state 2 is the greater of the two. That is, the input frame is judged to be more similar to state 2 than to state 1. If the input frame actually matches state 2 at this point, then the evaluation value of state 1 is deemed not to affect the probability of the ultimate state in the word in question as far as the Viterbi path search is concerned. Therefore the next state is reached in which to start collation on the next frame 2.

If the same word is collated with the next frame 2, the result of the check in 801 is negative. Since the collation starting position "n" has been updated to 2, step 803 is carried out to compute evaluation values P2(2) and P3(2) regarding the second and third phoneme models; the evaluation values are assumed here to be 85 and 84 for the second and third phoneme models respectively. In step 803, likelihoods between frame 2 on the one hand and states 2 and 3 on the other hand are also computed; the likelihoods are assumed here to be 50 and 40 for states 2 and 3 respectively. For the current group of phoneme models being collated, the result of the check in step 804 is negative. Since the result of the check in step 805 is negative with respect to the two evaluation values above, step 806 is not executed, and the collation starting position "n" is always 2.

If the same word is collated with the next frame 3, the result of the check in step 801 is negative. Since the collation starting position "n" is still 2, step 803 is carried out to compute evaluation values P2(3) and P3(3) regarding the second and third phoneme models; the evaluation values are assumed here to be 142 and 143 for the second and third phoneme models respectively. In step 803, likelihoods between frame 3 on the one hand and state 2 and 3 on the other hand are also computed; the likelihoods are assumed to be 10 and 90 for states 2 and 3 respectively. For the current group of phoneme models being collated, the result of the check in step 804 is negative. Because the result of the check in step 805 is affirmative for the two evaluation values above, step 806 is performed to update the collation starting position "n" to 3.

If the same word is collated with the next frame 4, the result of the check in step 801 is negative. Since the collation starting position "n" has been updated to 3, step 803 is carried out to compute evaluation values P3(4) and P4(4) regarding the third and fourth phoneme models; the evaluation values are assumed here to be 241 and 240 for the third and fourth phoneme models respectively. In step 803, likelihoods between frame 4 on the one hand and states 2 and 3 on the other hand are also computed; the likelihoods are assumed to be 70 and 30 for states 2 and 3 respectively. For the current group of phoneme models being collated, the result of the check in step 804 is negative. Because the result of the check in step 805 is negative for the two evaluation values above, step 806 is not carried out and the collation starting position "n" is always 3.

If the same word is collated with the next frame 5, the result of the check in step 801 is negative. Since the collation starting position "n" is still 3, step 803 is carried out to compute evaluation values P3(5) and P4(5) regarding the third and fourth phoneme models; the evaluation values are assumed here to be 318 and 319 for the third and fourth phoneme models respectively. In step 803, likelihoods between frame 5 on the one hand and states 2 and 3 on the other hand are also computed. These likelihoods are omitted from FIG. 7. Because the result of the check in step 804 is affirmative for the current group of phoneme models being collated, steps 805 and 806 will not be carried out. The collation starting position "n" is always 3. If there exists any subsequent frame, the same processing as that on frame 5 is carried out.

The evaluation value for the word being processed with respect to the input speech up to frame 5 is the highest of all values obtained so far (319 in this example). This value is the same as that acquired by the conventional method shown in FIG. 5. However, as has been evident from the above computations, the embodiment of the invention computes, for a given frame, evaluation values and likelihoods regarding only a predetermined number (m+1) of phoneme models (or states) among all models constituting the phoneme model string for a given word (or all states with regard to the word). Thus if the average total number of phoneme models regarding each word is illustratively 10 through 12 and if m+1=2, then the number of computations by the embodiment becomes about one-fifth or one-sixth of the number of computations required by the conventional method in FIG. 5. Correspondingly, the necessary capacity of buffers for accommodating interim computation results is about one-fifth or one-sixth of the buffer capacity required by the conventional method in FIG. 5. The inventive method is also more advantageous than the conventional beam search method in terms of computation count and required memory capacity.

Variations

The above-described embodiment is for illustrative purposes only and not limitative of the invention. Changes and variations may be made without departing from the spirit or scope of the invention. A few variations are described below.

(1) The judging step 805 (FIG. 4) for determining whether or not to change the phoneme model to be collated may be replaced by the following process: of a group of the n-th through (n+)th phoneme models having evaluation values Pn(I) through Pn+m(I), the phoneme model with the highest evaluation value is detected. A check is made to see if the detected phoneme model is located past the middle of the phoneme model group toward the end of the group. That is, if the phoneme having the highest evaluation value is the (n+g)th phoneme model, then a check is made to see if g>m/2. If the phoneme model with the highest evaluation value is judged to be located past the middle of the phoneme model group toward the group end, then step 806 (FIG. 4) is carried out to update the collation starting position "n" by 1 with respect to the next frame. If "m" is equal to 1, the result of the check by this variation is the same as that by the embodiment described above. In other words, if the result of the check by this variation is to differ from that by the above embodiment, then (m+1) must be greater than 2. The process of this variation for determining whether or not to change the phoneme model to be collated is more accurate than step 805 of the above embodiment in judging the need to change the collation starting position. It should be noted however that the above embodiment is simpler in computing procedures than this variation of the embodiment.

(2) A modification of the variation (1) above may involve updating the collation starting position "n" not by 1 but by a value such that the phoneme model with the highest evaluation value is located approximately in the middle of the group of phone models being collated. In this case, too, (m+1) must be greater than 1. This modification is more accurate than the corresponding step or process of the above embodiment or variation in judging the need for changing the phoneme model to be collated.

(3) In any of the above-described embodiment, variations and modifications, speech recognition units were assumed to be phonemes. That is, the dictionary/syntax file 106 contains character strings that represent phoneme strings constituting words. The phoneme model file 105 holds HMM models of various phonemes. The speech recognition program utilizes these files in generating the phoneme model string corresponding to each word. Alternatively, the invention may also be applied to speech recognition systems that employ phoneme elements (i.e., units smaller than phonemes) as speech recognition units. More specifically, the phoneme model file 105 may contain models regarding the phoneme elements smaller than phonemes. For example, a phoneme "su" is replaced by phoneme elements "ss" and "su" in memory, a phoneme "zu" by phoneme elements "zz" and "zu," and a phoneme "ki" by phoneme elements "kk" and "ki." The speech recognition program generates a phoneme element string "ss," "su," "zz," "zu," "kk" and "ki" with regard to the word "su zu ki." In this case, too, each of the phoneme elements is regarded as one of the states used by the above-described embodiment of the invention.

As described, the method and system according to the invention shorten the time required to collate a plurality of speech recognition units with a given portion of the target input speech to be recognized. The inventive method and system also reduce the capacity of memory needed to accommodate computation results.

What is claimed is:

1. A speech recognition method for collating a target speech with each of a plurality of speech candidates in order to recognize said target speech, said speech recognition method comprising the steps of:

(a) collating one of said plurality of speech candidates successively with an ordered plurality of speech frames obtained by dividing said target speech; and (b) performing said step (a) on another plurality of speech candidates;

wherein said step (a) includes the steps of:

(a1) determining a plurality of likelihoods representing similarities between one of said ordered plurality of speech frames, and consecutive ones of ordered phonemes in a plurality of phoneme strings representing one of said plurality of speech candidates;

(a2) determining a plurality of evaluation values representing similarities between said consecutive ones of said ordered phonemes and said target speech, based on said plurality of likelihoods determined in said step (a1) and on a plurality of transition probabilities corresponding to different combinations of said consecutive ones of the ordered phonemes; and (a3) if said evaluation value for the head phoneme in said consecutive ones of said ordered phonemes is smaller than that of the last phoneme in said consecutive ones of said ordered phonemes, replacing phonemes to be collated for the next one of said speech frames with new consecutive ones of said ordered phonemes, wherein said new consecutive ones are said consecutive ones with the head phoneme removed from therefrom and with the next phoneme in the corresponding phoneme string added to said consecutive ones;

wherein said new consecutive ones of the ordered phonemes are used when said step (a) is carried out on said next speech frame in said ordered plurality of speech frames.

2. A speech recognition method according to claim 1, wherein said step (a3) includes the steps of:

if said evaluation value for the head phoneme in said consecutive ones of said ordered phonemes is not smaller than that of the last phoneme in said consecutive ones of said ordered phonemes, then determining said consecutive ones of the ordered phonemes with no modification as said new consecutive ones of the ordered phonemes.

* * * * *